United States Patent Office 3,454,405
Patented July 8, 1969

1

3,454,405
PREPARATION OF A PROTEINACEOUS
FOOD SALAD
Paul L. Beach, Salisbury, Md., assignor to Proteus Foods
& Industries, Inc., New York, N.Y., a corporation of
Delaware
No Drawing. Filed Apr. 15, 1966, Ser. No. 542,734
Int. Cl. A23b 3/06, 7/04, 1/06
U.S. Cl. 99—188                                              14 Claims

ABSTRACT OF THE DISCLOSURE

Preparation of proteinaceous food salad which can be sterilized and canned at above 220° F. or frozen which has long storage characteristics without attaining off-flavors and colors, avoiding emulsion breakdown and particularly browning, comprising a proteinaceous food such as animal meat, fish, certain vegetables, mixed with a salad dressing comprising 2 to 15 percent by weight microcrystalline cellulose, 10 percent to 35 percent vegetable oil, 0.01 percent to 11 percent by weight artificial sweetener, 0.1 to 1 percent by weight vegetable gum, 0.05 percent to 1 percent by weight of an emulsifier such as the polyoxyethylene derivative of fatty acid partial esters of hexitol and water.

---

This invention relates generally to a salad composition having heat stability and long storage characteristics. More particularly, the present invention is concerned with a salad formed from proteinaceous foods, such as meats, including animal or fish, shell fish, as well as vegetables, and a salad dressing which, when mixed with the proteinaceous food forming the salad, enables the food salad to be sterilized by means of conventional canning or conventionally freezing, without developing off-flavor, discoloration, or a weeping of the dressing ingredients through a breakdown of the dressing emulsion.

Meat, fish, or vegetable salads have been enjoyed the world over for years beyond count. The dressing often used to form these salads is of the mayonnaise type and contains, among other ingredients, oil, water, starch, vinegar, sugar, and flavorings. The conventional mayonnaise, it is known, is rather unstable, particularly during application of heat, and has as well poor storage characteristics. It follows, therefore, that while foods of most types can be adapted to conventional preserving processes, such as canning or freezing, any salad made from mayonnaise type salad dressing in particular, and other salad dressings in general, are unable to withstand the high temperature necessary for sterilization in accordance with the usual canning procedures and is also unable to undergo the rigors of freezing and thawing, as an alternative to canning without a breakdown in the salad dressing emulsion occurring, with the consequent loss through weeping of the liquid components. Further, it has been found that canning or freezing deleteriously affects not only the salad dressing, but also the meats and vegetables. In view of these problems there has been prior to the present invention no known successful canned or frozen salad having proteinanceous foods.

2

The problem is particularly acute in the case of fish, such as tuna, since any attempt to can a tuna fish salad composed of the usual ingredients of mayonnaise, including vinegar, sugar, and starch, causes not only a breakdown of the salad dressing emulsion, but also induces an acid hydrolysis of the starch and sucrose sugar present in the mayonnaise or salad dressing, producing during the heating processing the formation of reducing sugars that react with the amino groups of the tuna fish meat protein, causing great degradation of the natural color and flavor of the tuna meat. It has been found also that the greater the heating and the longer the time to which the salad is subjected to high heat, such as is necessary to sterilize the contents during canning, the greater also the discoloration which is often accompanied by unpleasant ammoniacal and acrid odors which render the tuna salad totally unacceptable.

The problem of discoloration and off-flavor during canning is further compounded by reason of the inherent consistency and density of the fish salad in the can. It has been found that the mixture of the dressing with the tuna fish meat results in a dense composition having poor heat transfer characteristics, thus requiring that the sterilization be for a relatively longer period of time and also conducted at a high temperature. Of course, the size and shape of the can is important, and for large cans of tuna fish salad, principally usable for the volume consumer such as restaurants, institutions, and the like, the sterilization requirement time and temperature is over 2½ hours at 250° F., or 3¼ hours at 240° F., resulting in a totally unpalatable and unsalable product.

Accordingly, it is one of the principal objects of the present invention to provide a method and composition which produces a packaged food salad having long storage characteristics without off-flavors and discoloration.

Another object of the present invention is the provision of a process for making salad from proteinaceous animal meats, fish meats, shell fish meats, vegetables, and the like, which includes a salad dressing which may be of the mayonnaise type and is able to be preserved for long periods by canning or freezing.

A further object of the present invention is the provision of a food salad containing a mayonnaise type salad dressing in which acid hydrolysis, resulting in degradation of the natural color and flavor of the food is avoided.

A further and more particular object of the present invention is the avoidance of the breakdown of salad dressing emulsion in food salad which is sterilized or frozen for preservation.

This invention also has as an object the provision of a salad dressing meat or vegetable composition which is easy and economical to prepare and which importantly retains the taste and texture completely acceptable in comparison with conventional salad dressing such as mayonnaise.

Other objects and advantages of the present invention will become apparent to those skilled in the art from the following description.

Briefly, the present invention may be stated to include a proteinaceous food salad which is packaged, such as by canning or freezing, to attain longer storage characteristics without off-flavor or color and which contains a proteinaceous food, such as animal meat, fish meat, shell fish meat, or vegetables mixed with a salad dressing containing at least microcrystalline cellulose, vegetable oil, an artificial sweetener, vegetable gum, vinegar, and an emulsifier. In the preparation of this food, conventional canning to sterilize the entire contents of the container is achieved through heating above 220° F. for several hours or freezing to a temperature below 32° F. without any off color or flavor.

Salad dressings vary in type and composition, but generally it may be stated that they contain a blend of water, oil, starch, vinegar, sugar, and spices, which form an emulsion that is not stable under high temperatures or below freezing temperatures. It has been found that the vinegar, which contains acetic acid, hydrolyzes the starch and sucrose sugars present in the dressing at high temperatures, causing the darkening or off color taste and odor of the food. These deleterious results are noticeable in all protein containing foods. This invention, however, is applicable to all types of animal meats, such as four-footed animals, including ham, the fowl meats such as turkey, chicken, and the like, fish and shell fish such as tuna, salmon, crab, lobster, shrimp, and others, as well as vegetables such as potatoes. The term "food" as used hereafter is intended to include any of these proteinaceous, edible substances which are capable of being frozen or canned without losing their texture or taste.

It is now found that if there is a removal of the starch and sugar, the problem of off colors is avoided, but there is a complete loss of desirable taste and texture, due to the absence of the starch and sugar. However, it has been discovered that microcrystalline cellulose not only will provide, in the absence of starch, the desirable texture, but also has the desirable property of supplying the taste similar to mayonnaise, and more importantly is not subject to acid hydrolysis. Similarly, sugar, when omitted and replaced by the artificial sweeteners, avoids one of the important reactants in the undesirable acid hydrolysis. The salad dressing of the present invention, therefore, may be said to include microcrystalline cellulose, an artificial sweetener, vegetable gums, water, vegetable oils, vinegar, and an organic emulsifier.

The microcrystalline cellulose utilized is that produced under the trade name of "Avicel," described in detail in U.S. Patent No. 3,067,037, dated Dec. 4, 1962, as cellulose crystallite aggregates, which is the same as the microcrystalline cellulose referred to herein.

The amount of microcrystalline cellulose found desirable is from 2% to 15% of the weight of the salad dressing, while generally amounts in the range from 3% to 7% are preferred. It has been found that carboxymethyl cellulose or methyl cellulose, if desired, may be utilized in amounts between .5% to 6%, in addition to the microcrystalline cellulose; however, neither of these optional ingredients has been found to properly substitute entirely for the microcrystalline cellulose.

The vegetable oils found usable are the oils typically used for salad dressing, among which may be included olive oil, corn oil, soybean oil, cottonseed oil, and others. The amount of vegetable oil found suitable in the salad dressing is between 10% and 35%, while within this range at least 25% has been found preferable.

Any of the well known vegetable gums, such as gum tragacanth, carrageenin, karaya gums, ghatti, and arabic gums, may be used. Others that may be used include agar, sodium alginate, locust bean, and guar, which may be used in amounts between .1% and 1%, with .5% to .8% being preferable. The purpose of the vegetable gum is to act as a stabilizer and assist in preventing the weeping of the water from the emulsion of oil and water.

The artificial sweeteners are important in order to avoid a harshness of taste which would occur without the sweetener. The use of the artificial sweeteners is important also to prevent reaction with the vinegar, particularly in the case of fish meat. The artificial sweeteners used are well known in the art, among which may be included the cyclamates such as calcium cyclamate, saccharin, and sorbitol. The amounts of cyclamates and saccharin range from .01% to .04%, whereas, the sorbitol, being considerably less sweet than other artificial sweeteners, requires the presence of from 6% to 11% by weight of the salad dressing.

The organic emulsifier that may be used is a polyoxyethylene derivative of the fatty acid partial esters of hexitol and hydrides. Within this grouping are the polyoxyethylene sorbitan esters of stearic and oleic acids. Specific emulsifiers found desirable are the polyoxyethylene monostearate, polyoxyethylene sorbitan monooleate, and polyoxyethylene sorbitan tristearate. The amount of the emulsifier that may be used can vary from .05% up to 1%. Generally it has been found that from .1% to .7% is preferable.

Vinegar in the concentration equivalent to 7% to 15% (50 grain basis) may be used satisfactorily according to the present invention.

Water is used to form the salad dressing and is generally present in amounts between 25% and 45%. Flavoring and spices such as salt and pepper in amounts up to 2% to 4% may be added for improved taste and flavor; however, these flavorings and spices form no part of the present invention.

The salad dressing as above described is mixed with the meat or vegetable that forms the salad in amounts between 40% to 60% dressing, the remainder being the meat or vegetable, enabling the salad to be hermetically sealed in glass or metal containers able to withstand heat processing necessary to sterilization, such as at temperatures as high as 220° F., without degradation of the meat or vegetable or a breakdown of the emulsifying characteristics of the salad dressing. Similarly, the dressing withstands freezing.

In accordance with the present invention the meat or vegetable is distributed and blended wtih the salad dressing in a mixing tank. After the dressing has been mixed in any convenient manner in a mixing tank, the dressing is desirably—although not necessarily—passed through a homogenizer under high pressure. The comminuted or chunk meat or vegetable is mixed with the salad dressing and the mixture is filled into cans, glasses or jars which are closed and then processed in accordance with the usual canning procedures, which, for a number 2½ can requires 3¼ hours at 240° F. to effectively sterilize the entire contents of the can. For a 7-ounce filled can the time can vary from 75 minutes at 250° F. to 95 minutes at 240° F.; for the large 30-ounce can from 2½ hours at 250° F. to 3¼ hours at 240° F. is required to effect proper sterilization.

EXAMPLE

The salad dressing formula was prepared with

| | Percent by wt. |
|---|---|
| Microcrystalline cellulose | 5.0 |
| Organic emulsifier polyoxyethylene sorbitan monostearate | .3 |
| Water | 40.0 |
| Vegetable oil | 27.0 |
| Sorbitol sweetener | 11.0 |
| Gum tragacanth | .7 |
| Vinegar | 9.0 |
| Egg yolk solids | 3.0 |
| Remainder—spices, seasonings and flavorings, including salt and pepper. | |

The dressing is mixed in a mixing tank and then passed through a homogenizer. Thereafter 47.5% chunk meat tuna is mixed with 52½% homogenized dressing. The tuna salad mixture is then filled into No. 2½ cans with a filled weight ranging between 29½ and 30 ounces. The cans are then closed, the exterior washed, and the contents of the cans sterilized in a conventional manner for 3½ hours at 240° F. Upon storage for several days and then reopened, the contents were found to have excellent flavor and taste similar to freshly prepared tuna fish salad.

From the foregoing detailed description it will be evident that there are a number of changes, adaptations, and modifications of the present invention which come within the province of those skilled in the art; however, it is intended that all such variations not departing from the spirit of the invention be considered as within the scope thereof as limited solely by the appended claims.

What is claimed is:

1. A canned proteinaceous food salad and having long storage characteristics without attaining off-flavors and colors, comprising:
a proteinaceous food mixed with a salad dressing comprising 2% to 15% by weight microcrystalline cellulose, 10% to 35% vegetable oil, .01% to 11% by weight artificial sweetener, .1% to 1% by weight vegetable gum, .05% to 1% by weight of an emulsifier selected from the group consisting of the polyoxyethylene derivatives of fatty acid partial esters of hexitol, and water.

2. The composition of claim 1, including vinegar in an amount between 7% to 15% by weight.

3. The composition of claim 1, wherein the emulsifier is a polyoxyethylene sorbitan ester of fatty acids.

4. The composition of claim 3, wherein said emulsifier is formed from esters of fatty acids selected from the group consisting of stearic and oleic acids.

5. A frozen proteinaceous food salad and having long storage characteristics without attaining off-flavors and colors, comprising: a proteinaceous food mixed with a salad dressing comprising 2% to 15% by weight microcrystalline cellulose, 10% to 35% vegetable oil, .01% to 11% by weight artificial sweetener, .1% to 1% by weight vegetable gum, .05% to 1% by weight of an emulsifier selected from the group consisting of the polyoxyethylene derivatives of fatty acid partial esters of hexitol, and water.

6. The composition of claim 5, including vinegar in an amount between 7% to 15% by weight.

7. The composition of claim 5, wherein the emulsifier is a polyoxyethylene sorbitan ester of fatty acids.

8. The composition of claim 7, wherein said emulsifier is formed from esters of fatty acids selected from the group consisting of stearic and oleic acids.

9. The process of packaging a proteinaceous food salad having long storage characteristics without off-flavors or darkening, comprising:
mixing said food with a dressing comprising 2% to 15% by weight microcrystalline cellulose, 10% to 35% vegetable oil, .01% to 11% by weight artificial sweetener, .1% to 1% by weight vegetable gum, .05% to 1% by weight of an emulsifier selected from the group consisting of the polyoxyethylene derivatives of fatty acid partial esters of hexitol, and water;
conventionally canning said salad including sterilizing all of said salad at a temperature above 220° F.

10. The process of claim 9, wherein vinegar in an amount of 7% to 15% by weight is included in said dressing.

11. The process of claim 9, wherein the food is fish.

12. The process of claim 9 including adding vinegar, heating to sterilize.

13. The process of claim 9, wherein said food is tuna fish and including the step of adding vinegar.

14. The process of packaging a proteinaceous food salad having long storage characteristics without off-flavors or darkening, comprising: mixing said food with a dressing comprising 2% to 15% by weight microcrystalline cellulose, 10% to 35% vegetable oil, .01% to 11% by weight artificial sweetener, .1% to 1% by weight vegetable gum, .05% to 1% by weight of an emulsifier selected from the group consisting of the polyoxyethylene derivatives of fatty acid partial esters of hexitol, and water, conventionally freezing said salad.

References Cited

UNITED STATES PATENTS

| | | | |
|---|---|---|---|
| 3,023,104 | 2/1962 | Battista | 99—139 |
| 3,067,037 | 12/1962 | Herald et al. | 99—139 |
| 3,366,494 | 1/1968 | Bower et al. | 99—144 |
| 2,217,698 | 10/1940 | Musher | 99—188 |

A. LOUIS MONACELL, *Primary Examiner.*

J. M. HUNTER, *Assistant Examiner.*

U.S. Cl. X.R.

99—144, 182, 187, 192, 194, 195